No. 734,126. PATENTED JULY 21, 1903.
H. M. HARDING.
TELPHER.
APPLICATION FILED AUG. 22, 1902.
NO MODEL.

Witnesses
Geo. Hadley Jr.
Benton S. Oppenheimer

Inventor
Henry M. Harding
By his Attorneys
Seymour, Seymour & Harmon

No. 734,126. Patented July 21, 1903.

UNITED STATES PATENT OFFICE.

HENRY M. HARDING, OF NEW YORK, N. Y.

TELPHER.

SPECIFICATION forming part of Letters Patent No. 734,126, dated July 21, 1903.

Application filed August 22, 1902. Serial No. 120,631. (No model.)

*To all whom it may concern:*

Be it known that I, HENRY M. HARDING, residing at New York, in the county and State of New York, have invented certain new and useful Improvements in Overhead Carriers or Telphers or Supports for Suspended-Cable-Track Roads in Connection with Suspended Trucks or Cars, of which the following is a specification.

Figure 1:
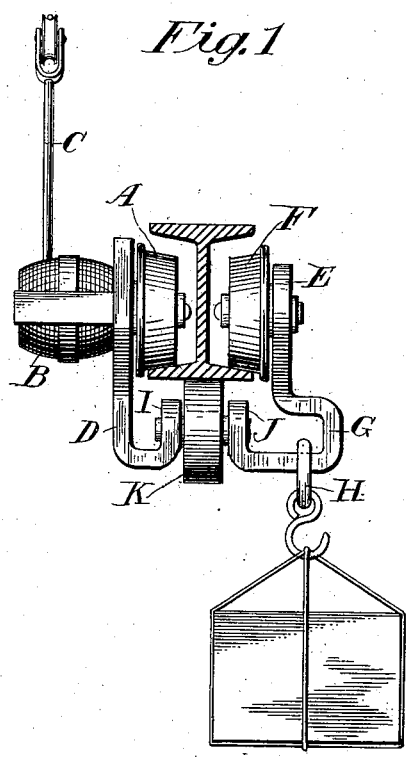
Figure 2:
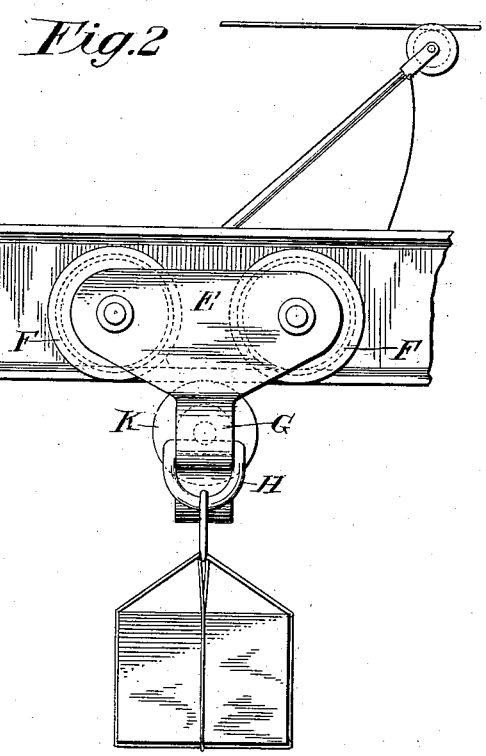
Figure 3:
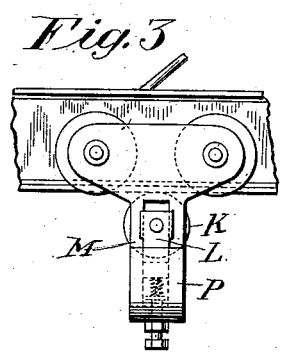
Figure 4:
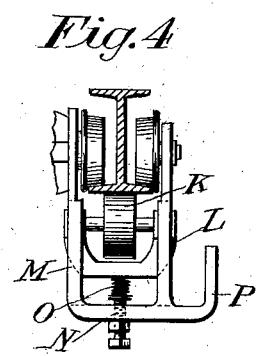
Figure 5:
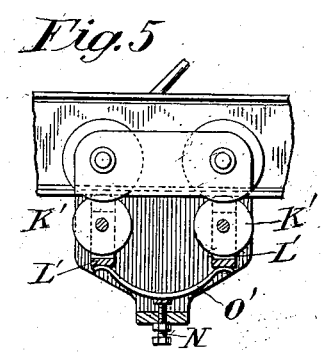

In the drawings, Figure 1 is an end view of a carriage embodying my invention. Fig. 2 is a side elevation thereof. Figs. 3, 4, and 5 are illustrations of modifications.

It is desirable in these devices when they are used in factories, warehouses, or the like to have the motors placed on one side only of the carriage on account of the limited space in which switches and turnouts can be placed. Two motors are usually used coupled together, and the weight of these motors would cause the carriage to tilt were not means taken to prevent this.

As illustrated, the motor is designed to run upon I-beams, the wheels being beveled to suit the bevel of the flanges of the beam. Running upon the flanges are the wheels A of the shafts, on which are fixed motors B, taking current from a suitable trolley C. The wheels and motors are supported in a curved frame or bracket D. On the opposite side is another curved frame or bracket E, in which are supported the wheels F. The curved bracket E has an offset G, from which is supported the weight-carrying device H. The ends of these two frames are curved upward, as at I, and are connected together by a shaft J, on which is carried the wheel K, which bears against the under side of the beam. The parts are so proportioned that the weight to be carried will counterbalance the weight of the motors.

Sometimes it becomes necessary owing to grades to increase the traction, and for this purpose I put the wheel K in an adjustable bearing, so that the grip of the wheel A on the rail may be varied. In Fig. 3 the shaft of the wheel K has its bearings in a sliding yoke L, supported by the frame M, which is of a substantially U-shaped form, the upper part of the frame carrying both the motor and the idler-wheels. The sliding yoke is adjusted by means of a screw N, running through a threaded bearing in the bottom of the frame. Between the head of the screw N and the sliding frame is a spring O. By setting up on the screw it will be seen that the wheels are clamped more tightly upon the flange, but with a yielding pressure. At one side of the frame I provide an offset P, to which the load-carrying device is attached. Fig. 5 shows a modification of this arrangement, in which two wheels K' K' are carried by the frame and bear against the under side of the rail. These wheels are carried by sliding yokes L, and under these yokes bear the ends of a spring O', against the center of which bears the screw N. The action of this device is the same as that of the one heretofore described.

I do not herein claim, broadly, a carrier having wheels on each side of the frame running on the beam with electric motors on the shafts of the wheels and a weight-carrying device situated substantially beneath said wheels with means to prevent tilting of the carriage, as such broad invention is substantially claimed in my application, Serial No. 120,630, filed August 22, 1902.

What I claim, and desire to secure by Letters Patent, is—

1. In an overhead telpher a frame carrying wheels adapted to run on the beam or overhead support, motors placed on one side of said frame and attached to the axles of the wheels on that side, and weight-carrying means so supported as to balance the weight of the motors.

2. In an overhead telpher a frame carrying wheels adapted to run on the beam or overhead support, motors placed on one side of said frame and attached to the axles of the wheels on that side, weight-carrying means so supported as to balance the weight of the motors and a wheel carried by the frame bearing against the under side of the overhead support substantially as described.

3. In an overhead telpher a frame carrying wheels adapted to run on the beam or overhead support, motors placed on one side of said frame and attached to the axles of the wheels on that side, weight-carrying wheels so supported as to balance the weight of the motors, and means for varying the tractive force of the wheels, substantially as described.

4. In an overhead telpher a frame carrying wheels adapted to run on the beam or overhead support, motors placed on one side of said frame and attached to the axles of the wheels on that side, weight-carrying means so supported as to balance the weight of the motors, a wheel bearing against the under side of the rail, and an adjustable bearing for said wheel, substantially as described.

In witness whereof I have hereunto set my hand, in the city, county, and State of New York, this 16th day of August, 1902.

HENRY M. HARDING.

Witnesses:
H. J. LILLIE,
JOHN J. RANAGAN.